United States Patent
Hisatomi et al.

(10) Patent No.: US 8,094,974 B2
(45) Date of Patent: Jan. 10, 2012

(54) PICTURE DATA MANAGEMENT APPARATUS AND PICTURE DATA MANAGEMENT METHOD

(75) Inventors: Kenji Hisatomi, Fukuoka (JP); Shogo Hamasaki, San Jose, CA (US); Takahiro Higashimura, Kyoto (JP)

(73) Assignee: Panasonic Corporation, Osaka (JP)

( * ) Notice: Subject to any disclaimer, the term of this patent is extended or adjusted under 35 U.S.C. 154(b) by 1022 days.

(21) Appl. No.: 11/996,624

(22) PCT Filed: Jul. 25, 2006

(86) PCT No.: PCT/JP2006/314633
§ 371 (c)(1),
(2), (4) Date: Jan. 24, 2008

(87) PCT Pub. No.: WO2007/013432
PCT Pub. Date: Feb. 1, 2007

(65) Prior Publication Data
US 2010/0284566 A1 Nov. 11, 2010

(30) Foreign Application Priority Data
Jul. 26, 2005 (JP) .................................. 2005-216401

(51) Int. Cl.
*G06K 9/54* (2006.01)
(52) U.S. Cl. ....................................................... 382/306
(58) Field of Classification Search .......... 382/305–306; 701/207; 348/333.02–333.05
See application file for complete search history.

(56) References Cited

U.S. PATENT DOCUMENTS

| 6,657,666 | B1 * | 12/2003 | Imagawa et al. ......... 348/333.02 |
| 7,096,428 | B2 | 8/2006 | Foote et al. |
| 7,466,357 | B2 * | 12/2008 | Myojo ..................... 348/333.05 |
| 7,742,099 | B2 * | 6/2010 | Ueno et al. .................... 348/372 |
| 7,792,637 | B2 * | 9/2010 | Matsuura et al. ............. 701/207 |
| 7,916,201 | B2 * | 3/2011 | Heikkila et al. ......... 348/333.05 |
| 2001/0016064 | A1 | 8/2001 | Tsuruoka et al. |
| 2004/0135890 | A1 | 7/2004 | Kaneko et al. |
| 2006/0149684 | A1 | 7/2006 | Matsuura et al. |

FOREIGN PATENT DOCUMENTS

CN 1240297 1/2000
(Continued)

OTHER PUBLICATIONS

International Search Report issued Oct. 24, 2006 in the International (PCT) Application of which the present application is the U.S. National Stage.

*Primary Examiner* — Ishrat I Sherali
(74) *Attorney, Agent, or Firm* — Wenderoth, Lind & Ponack, L.L.P.

(57) ABSTRACT

A relevance ratio adding unit (107) provides each landmark with a weight value according to the degree of relevancy with a shot still picture, using: the distance between each landmark and the shooting location, received from the landmark distance calculating unit (105); and a distance HL between the shooting location and the photographer's residential address, received from the parameter obtaining unit 106. A landmark identifying unit (108): designates one or several landmarks to be added to the still picture out of the landmarks with a weight value provided by the relevance ratio adding unit 107; and writes the designated landmark in a predetermined position of the picture data of the still pictures.

16 Claims, 10 Drawing Sheets

FOREIGN PATENT DOCUMENTS

| | | |
|---|---|---|
| EP | 1 128 660 | 8/2001 |
| JP | 2000-013722 | 1/2000 |
| JP | 2001-036842 | 2/2001 |
| JP | 2001-238129 | 8/2001 |
| JP | 2002-077805 | 3/2002 |
| JP | 2003-203251 | 7/2003 |
| JP | 2003-344078 | 12/2003 |
| JP | 2004-214760 | 7/2004 |
| WO | 2005/024688 | 3/2005 |

* cited by examiner

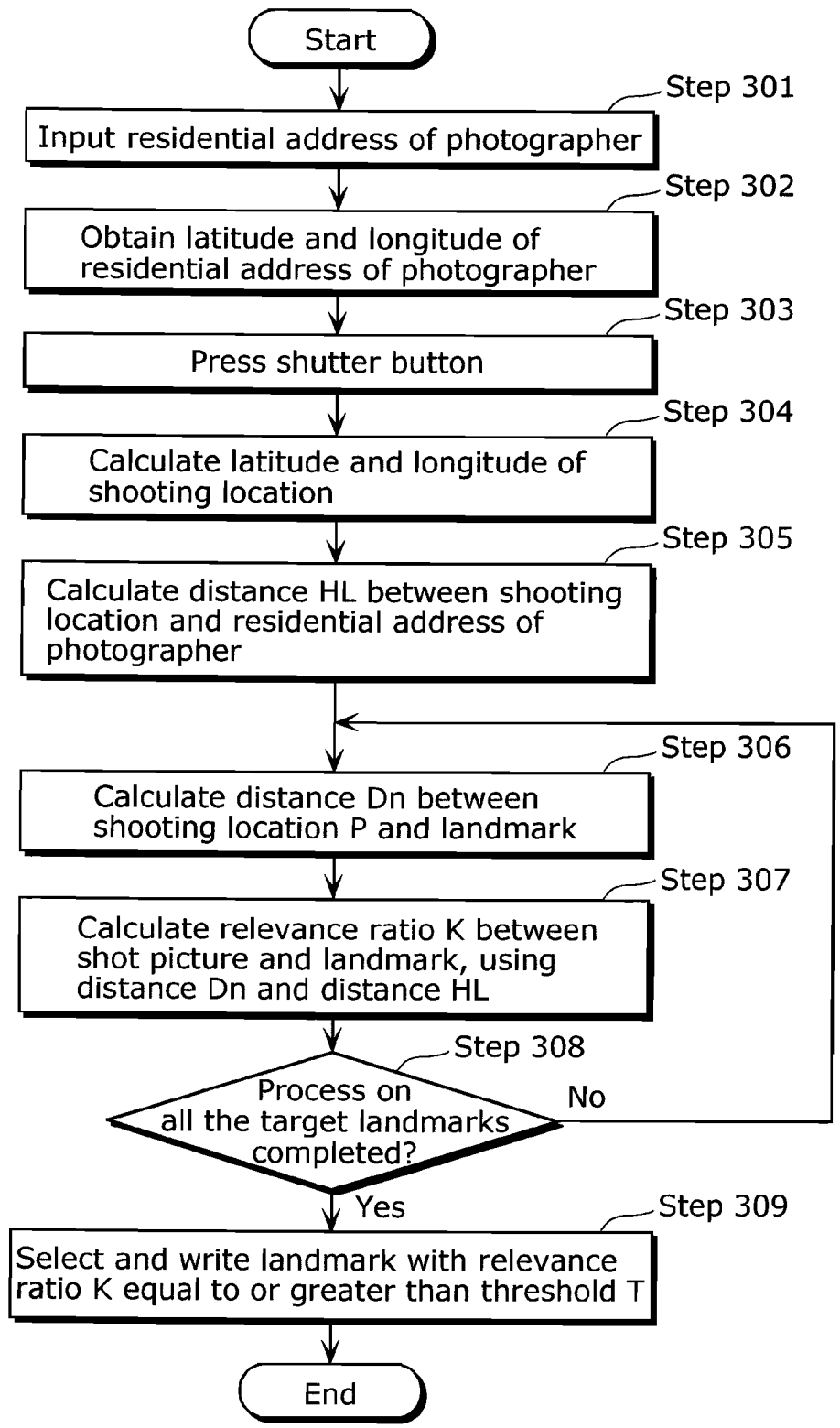

FIG. 4

| Explanation of location | Symbol | North latitude | East longitude |
|---|---|---|---|
| Shooting location | NE Ginza | 35 degrees 40 minutes 05 seconds | 139 degrees 46 minutes 05 seconds |
| Photographer A's residence | NE Osaka | 34 degrees 49 minutes 24 seconds | 135 degrees 42 minutes 40 seconds |
| Photographer B's residence | NE Tokyo | 35 degrees 41 minutes 25 seconds | 139 degrees 42 minutes 20 seconds |
| Landmark 1 : Ginza MK Building | NEMK Building | 35 degrees 40 minutes 10 seconds | 139 degrees 46 minutes 10 seconds |
| Landmark 2 : Yurakucho station | NE Yurakucho | 35 degrees 40 minutes 20 seconds | 139 degrees 46 minutes 00 seconds |
| Landmark 3 : TK tower | NETK Tower | 35 degrees 39 minutes 20 seconds | 139 degrees 44 minutes 47 seconds |

FIG. 6A

| Photographer=A | Landmark 1 | Landmark 2 | Landmark 3 |
|---|---|---|---|
| Name of landmark | Ginza MK Building | Yurakucho station | TK tower |
| Distance D from shooting location | 10m | 200m | 2000m |
| Distance HL between shooting location and A's residence | 600000m | 600000m | 600000m |
| Relevance ratio K | 250 | 70 | 51 |
| Adoptability as metadata at relevance ratio = 60 | Adopted | Adopted | Not adopted |

FIG. 6B

| Photographer=B | Landmark 1 | Landmark 2 | Landmark 3 |
|---|---|---|---|
| Name of landmark | Ginza MK Building | Yurakucho station | TK tower |
| Distance D from shooting location | 10m | 200m | 2000m |
| Distance HL between shooting location and B's residence | 6000m | 6000m | 6000m |
| Relevance ratio K | 203 | 23 | 4 |
| Adoptability as metadata at relevance ratio = 60 | Adopted | Not adopted | Not adopted |

PICTURE DATA MANAGEMENT APPARATUS AND PICTURE DATA MANAGEMENT METHOD

TECHNICAL FIELD

The present invention relates to a technique for managing picture data such as moving pictures and still pictures, and particularly to a technique for adding metadata which is used in organization and classification of the still pictures and the like.

BACKGROUND ART

The popularization of photographic apparatuses such as a digital camera and the like (hereinafter also referred to as a "camera and the like") allows the general public to shoot a lot of pictures, and laborsaving for organizing shot pictures and a function for automatically organizing the pictures are increasingly important. In general, a method is said to be effective among various methods for automatically organizing pictures. The method is intended for adding metadata to each picture, the metadata that indicates an attribute of the picture, and organizing each picture according to the added metadata.

Currently, various kinds of metadata which are standardized by specifications such as the EXIF and the like can be added to pictures shot by a camera and the like. Out of the various kinds of metadata, information on a location where pictures have been shot is useful, in particular, for organizing of the pictures. This is because, as can be expected that "where the pictures have been shot" is described to other people at first when the shot pictures are described, a shooting location provides highly significant information which represents the pictures.

In a conventional art, there is a camera which obtains position information of a shooting location through the GPS (Global Positioning System) when shooting pictures, and adds the position information to the pictures as metadata. Moreover, there is a system which: obtains a position of a camera and the like and the direction that the camera faces; estimates, in accordance with the values, the subject in a picture; obtains, from an electronic map, the name of the subject or the position information that indicates the location where the subject exists; and adds the position information as the metadata of the picture (See Patent reference 1, for example). Patent reference 1: Japanese Unexamined Patent Application Publication No. 2003-203251

A landmark represents metadata as an aide for a photographer to organize pictures.

However, there are cases where it is not enough as a landmark for a picture just when: a name, of a nearby building, which is identified based on the position information on the shooting location of a picture, is selected as a landmark; and a landmark is selected based on a general criterion. This is because a degree of relevancy between a building and the like and the picture varies depending on each photographer, and an irrelevant classification could be made due to the use of a selected landmark. Moreover, even though a shooting location and a landmark could be of proximity to each other, when a photographer is not familiar, there are cases where no clues could be found upon searching a picture.

As an example of the above problem, there are cases where a photographer's knowledge of the neighborhood is involved. Consider a case where a still picture is shot at "the intersection on Ginza 4th street" in Chuo ward, Tokyo. At this moment, when an algorism selects a building near the shooting location as a landmark, "Ginza XX Building" is obtained as the landmark from a map. However, when the photographer is not familiar with the geography around Ginza, there are cases where "Yurakucho station", which is farther than Ginza XX Building but more recognized as a public building, may well be selected as a landmark. This is an example that a landmark is selected only in accordance with the distance between a shooting location and a building; however, the selected landmark is difficult as a clue when a photographer is searching for a still picture.

As another example, there are cases where a photographer's movement history is involved. An ordinary restaurant and the like is unlikely to be a suitable landmark for a photographer, even though located very near a shooting location. However, in the case where the photographer has visited the restaurant, the restaurant can be a suitable landmark. This is an example that judgment only based on a general citation may result in selecting an unsuitable landmark as metadata for a still picture.

In view of the above problems, it is the object of the present invention to provide a picture data management apparatus and the like which is capable of appropriately selecting a landmark that can be a clue when organizing a picture shot by a digital camera and the like.

SUMMARY OF THE INVENTION

In order to solve the above problems, the picture data management apparatus of the present invention manages picture data using a landmark and includes: a landmark candidate selecting unit which selects candidates for landmarks added to the picture data; a parameter obtaining unit which obtains, for each of the selected landmark candidates, a parameter indicating a degree of relevance between the selected landmark candidate and the picture data; a weight value adding unit which adds, based on the obtained parameter, a predetermined weight value to the selected candidate of the landmark; and a landmark identifying unit which identifies the landmark to be added to the picture data, based on a degree of the added weight value.

Moreover, the parameter is a landmark distance which indicates a distance between a shooting location of a picture corresponding to the picture data and one of the selected candidates of the landmarks, and the weight value adding unit adds a greater weight value to one or more of the selected candidates of the landmarks having a shorter landmark distance.

Furthermore, the parameter obtaining unit is further operable to obtain a distance to a subject as a parameter, and the weight value adding unit increases a weight value of each of one or more of the selected candidates of the landmarks having a longer landmark distance as the landmarks have a longer distance to the subject.

In addition, the picture data managing apparatus includes a person detecting unit which detects a presence or absence of a person as the subject. The parameter obtaining unit further obtains the presence or absence of the person as a parameter, and the weight value adding unit decreases the weight value of one or more of the selected candidates of the landmarks having a longer landmark distance in the case where the person is present in the picture as the subject.

Moreover the picture data managing apparatus includes an indoor judging unit which judges whether or not a shooting location is indoor. The parameter obtaining unit obtains a parameter indicating whether the shooting location is indoor or not, and the weight value adding unit decreases the weight value of one or more of the selected candidates of the landmarks having a longer landmark distance in the case where the shooting location is indoor.

Furthermore, the landmark is included in an area. The parameter is a landmark distance indicating a distance between the shooting location of the picture corresponding to the picture data and a nearest boundary of each of the areas regarding the selected candidates of the landmarks, and the weight value adding unit adds a greater weight value to the landmark having a shorter landmark distance.

In addition, the parameter is: the landmark distance regarding the shooting location of the picture corresponding to the picture data and the candidate of the selected landmark; and a residence distance indicating a distance between the residence of the photographer of the picture corresponding to the picture data and the shooting location, and the weight value adding unit adds a is greater weight value to one or more of the selected candidates of the landmarks having the shorter landmark distance and having a longer residence distance.

Moreover, the picture data managing apparatus includes a picture storing unit which retains picture data of the picture shot by a photographer. The parameter obtaining unit further obtains, as a parameter, the number of previously shot pictures among the shot pictures in shooting history for counting the number of pictures added with a landmark which is the shooting location of the picture or is in the vicinity of the picture, and the weight value adding unit increases a weight value of each of one or more of the selected candidates of the landmarks having a shorter landmark distance in the case where the number of previously shot pictures in the shooting history is equal to or more than a predetermined number.

The picture data managing apparatus further includes: a shooting time obtaining unit which obtains a shooting time of the picture; an action history retaining unit which obtains and accumulates position changes, shown in position information, accompanied by movements of a photographer in chronological order; and a sojourn time calculating unit which calculates a sojourn time at a predetermined location, referring to the movement history holding unit. The parameter obtaining unit obtains the sojourn time as a parameter, and the weight value adding unit increases a weight value of a landmark which is a shooting location in the case where the sojourn time is equal to or more than a predetermined time.

In addition, the picture data managing apparatus includes an information reception collecting unit collecting information which a photographer has previously received. The parameter obtaining unit obtains, as the parameter, information reception frequency history indicating frequency of receiving information relevant to a shooting location, out of the information which has been previously received by the photographer, and the weight value adding unit adjusts the degree of the weight value of the landmark based on the information reception history.

Moreover, the picture data managing apparatus includes: a companion identifying unit which identifies a companion who the photographer accompanies during shooting; and a companion information collecting unit which collects information which the companion has previously received. The parameter obtaining unit obtains, as the parameter, companion information frequency history indicating frequency of receiving information relevant to the shooting location, out of the information which has been previously received by the companion, and the weight value adding unit adjusts the degree of the weight value of the landmark based on the companion information history frequency.

In addition, the landmark further includes information which indicates an attribute of the landmark. The parameter obtaining unit obtains the information indicating the attribute of the landmark as the parameter, and the weight value adding unit adjusts the degree of the weight value of the landmark based on the information indicating the attribute of the landmark.

Moreover, the picture data managing apparatus further includes a shooting time obtaining unit which obtains a shooting time at which a photographer shot a picture. The parameter obtaining unit obtains the time of shooting as the parameter, and the weight value adding unit adjusts a degree of the weight value of the landmark based on the shooting time.

In addition, the picture data managing apparatus further includes a picture data holding unit which adds the identified landmark to the picture data and holds the picture data; and a picture data searching unit which searches the picture data holding unit for the picture data, using a landmark and a weight value of the landmark as search keys.

Note that the present invention can also be implemented as: a picture data managing method utilizing characteristic structural units of the picture data managing apparatus in the present invention as steps; and a program causing a personal computer to execute those steps. Needless to say, the program can be widely distributed via a transmission medium such as a recording medium, like a DVD, and the Internet. Moreover, the present invention can also be implemented as an integrated circuit which includes the above-mentioned characteristic structural units.

According to the present invention, a parameter unique to a photographer, for example, a distance between a shooting location and a landmark, a distance between a shooting location and a residence, a shooting time, or the like, is reflected on a relevance ratio, so that the best landmark for each photographer can be selected to be added to a still picture. Furthermore, by conducting a search of the still picture, using the land mark as a search key, a search corresponding more to an attribute of the photographer is possible.

BRIEF DESCRIPTION OF DRAWINGS

FIG. 3 is a flowchart showing an operational flow of the picture data management apparatus in accordance with the first embodiment.

FIG. 4 shows symbols each indicating a geographical point and position information on the geographical point in a latitude and longitude form.

FIG. 6A shows calculation results of relevance ratios K for the photographer A, and FIG. 6B shows calculation results of relevance ratios K for the photographer B.

DETAILED DESCRIPTION OF THE INVENTION

An embodiment of the present invention is described below in detail with reference to the drawings. Note that the drawings are used for describing the following embodiments of the present invention but are not intended to limit the present invention.

First Embodiment

Figure 1:
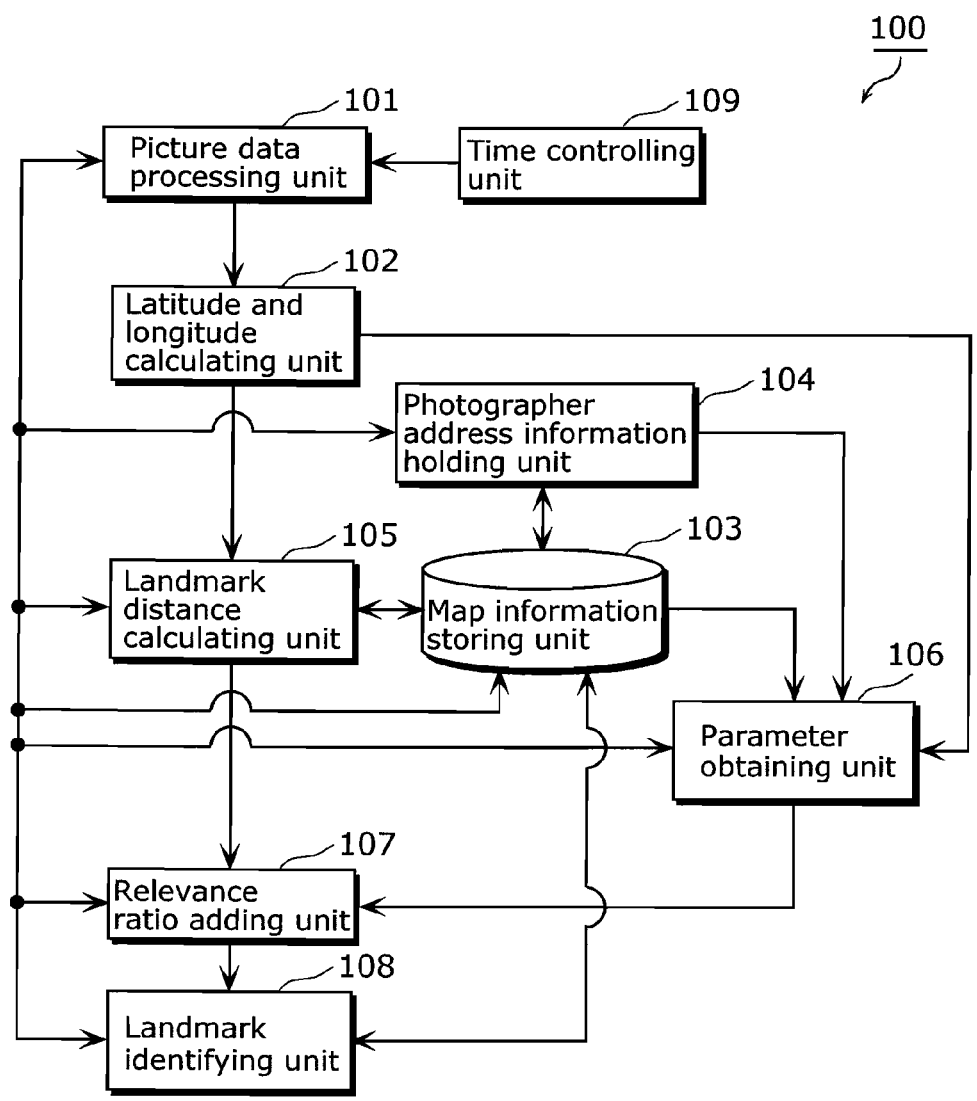
FIG. 1 is a block diagram showing a functional structure of a picture data managing apparatus in accordance with a first embodiment.

FIG. 1 is a block diagram showing a functional configuration of a picture data managing apparatus 100 in accordance with an embodiment of the present invention. The picture data managing apparatus 100, a digital camera for example, is an apparatus which has a function of generating a still picture triggered by a shooting operation of a user (also called a photographer), and which is capable of selecting information (hereinafter called rikuhyo, or landmark) which indicates a landmark (also called rikuhyo) that is added for organization and classification of a shot still picture, conforming to needs of the user. The picture data managing apparatus 100 includes a picture data processing unit 101, a latitude and longitude calculating unit 102, a map information storing unit 103, a photographer address information holding unit 104, a landmark distance calculating unit 105, a parameter obtaining unit 106, a relevance ratio adding unit 107, a landmark identifying unit 108, and a time controlling unit 109. At this point "parameter" is reference information when a landmark added to a still picture is determined.

The picture data processing unit 101 is, for example, a micro computer including a ROM, RAM, or the like. The picture data processing unit 101 has a function of obtaining and holding picture data to which various kinds of information (shooting time information, for example) is added, and controlling the entire picture data managing apparatus 100.

Note that the picture data processing unit 101 may include a picture generating (shooting) function. For example, the picture data processing unit 101: is connected to a shutter button on a digital camera (not shown); changes light, coming from the lens of a digital camera at the moment when a user presses the shutter button, into picture data of a still picture; and holds the picture data. Moreover, the picture data processing unit 101 obtains such shooting time information (date, hour, minute, and second) at the time when the still picture was shot (or, the time when the shutter is held down) from the time controlling unit 109, and holds the shooting time information and the still picture in an associated manner. Note that a conventional digital camera also includes this function.

The latitude and longitude calculating unit 102 has a function (one of the Global Positioning System (GPS) functions) for calculating latitude, longitude, and altitude of a certain geographical point on land (for example, a shooting location where a user stays or a landmark), using an electric wave emitted from plural artificial satellites. The latitude and longitude calculating unit 102: includes an antenna (not shown) which receives the electric wave from the artificial satellites; and calculates position information of such geographical point where the electric wave has been received in accordance with a predetermined expression. For example, at the time when the picture data processing unit obtains shooting time information, the latitude and longitude calculating unit 102 calculates the position information of the picture data managing apparatus 100 in a form of "latitude/longitude/altitude" and holds the position information. A conventional car navigation system also includes this function.

The map information storing unit 103 is a database, for example, in which the following is stored and linked with each other: each of landmarks, a building, an intersection, and a mountain; and position information of a place where the landmark exists. The landmarks are respectively classified into various kinds. Position information is defined in a form (latitude, longitude, and altitude). For example, when a user inputs the name of a landmark via an input and output unit (not shown) including an entering key and a liquid crystal display panel and the like, position information linked to the landmark is sent back. On the contrary, when position information is inputted, the landmark name which is linked to the position information is sent back. Note that position information is not the only information that links to each landmark. Each landmark may be linked with data indicating an attribute of each landmark, such as altitude and height at which the user is positioned (namely, over-ground height). The map information storing unit 103 has been sold a lot in a form of a DVD and the like as a database for an electronic map.

The photographer address information holding unit 104 holds the position information of user's residential address that has previously been entered by the user. Input methods in this case are, for example, as follows: when the picture data managing apparatus 100 is initialized, a character string indicating an address is inputted with a software keyboard; the user selects a place-name, through a touch-panel or a key operation, from options displayed on the picture data managing apparatus 100, on a prefecture-by-prefecture basis, following which a place-name with more detailed granularity on a municipality-by-municipality basis is hierarchically selected, accordingly; and the latitude and longitude calculating unit 102 in the picture managing apparatus 100 is activated in the residence to obtain the position information of the residence. In the case where the user's residential address which has been inputted is not inputted in a latitude and longitude form, the user's residential address may be converted into the latitude and longitude form using the map information storing unit 103. Specifically, the conversion is implemented by: searching for the landmark (classified in address) of the same position as the text data of the address that the user has inputted; and obtaining the position information linking to a corresponding landmark (classified in address).

Note that in the case where a corresponding landmark (classified in address) does not exist in the map information storing unit 103, a search is performed using a landmark (classified in address), which corresponds to more detailed address description; that is, an address without a street number, as a searching key. Then, less detailed address description; that is, a town name in addition to the street number is excluded in sequence until the corresponding landmark (classified in address) is found. When the corresponding landmark is not found to the end, it is assumed that a wrong address has been entered, and the address is out of the area which the map information storing unit 103 covers, such as a foreign address, following which the user is requested to re-enter the address or a predetermined address is assigned as the user's residential address. Here, the predetermined address is out of Japan.

The landmark distance calculating unit 105 calculates a distance between each landmark and a shooting location (called "landmark distance") based on the position information of a shooting location obtained from the latitude and longitude calculating unit 102 and the position information of each landmark obtained from the map information storing unit 103. Note that the number of landmarks, when a landmark distance is calculated, can be limited to the degree of distance from a shooting location and to a predetermined number.

The parameter obtaining unit 106 obtains a parameter which adds a weight value on a landmark-by-landmark basis in the later-described relevance ratio adding unit 107. In the embodiment, as an example of the parameter, a distance HL between a shooting location and photographer's residential address is used. Moreover, the parameter obtaining unit 106: obtains the position information, held in the photographer address information holding unit 104, of the photographer's residential address and the position information, of a shooting location, obtained at the time of shooting; and calculates the distance between the distance HL based on this information.

The relevance ratio adding unit 107 provides each landmark with a weight value according to the degree of relevancy between a shot still picture and each landmark, using: the distance between each landmark and the shooting location, received from the landmark distance calculating unit 105; and the distance HL between the shooting location and the photographer's residential address, received from the parameter obtaining unit 106. For the weight value mentioned in this case, a relevance ratio K is used to indicate the degree of relevancy between the shot still picture and the landmark. A calculation algorithm of the relevance ratio K is described later: the greater a value of the relevance ratio K becomes, the greater the relevancy between the still picture and the landmark.

The landmark identifying unit 108 identifies: one or several landmarks added to a still picture, based on the relevance ratio K of each landmark obtained from the relevance ratio adding unit 107; and writes the designated landmark in a predetermined position of the picture data of the still picture.

Figure 2:
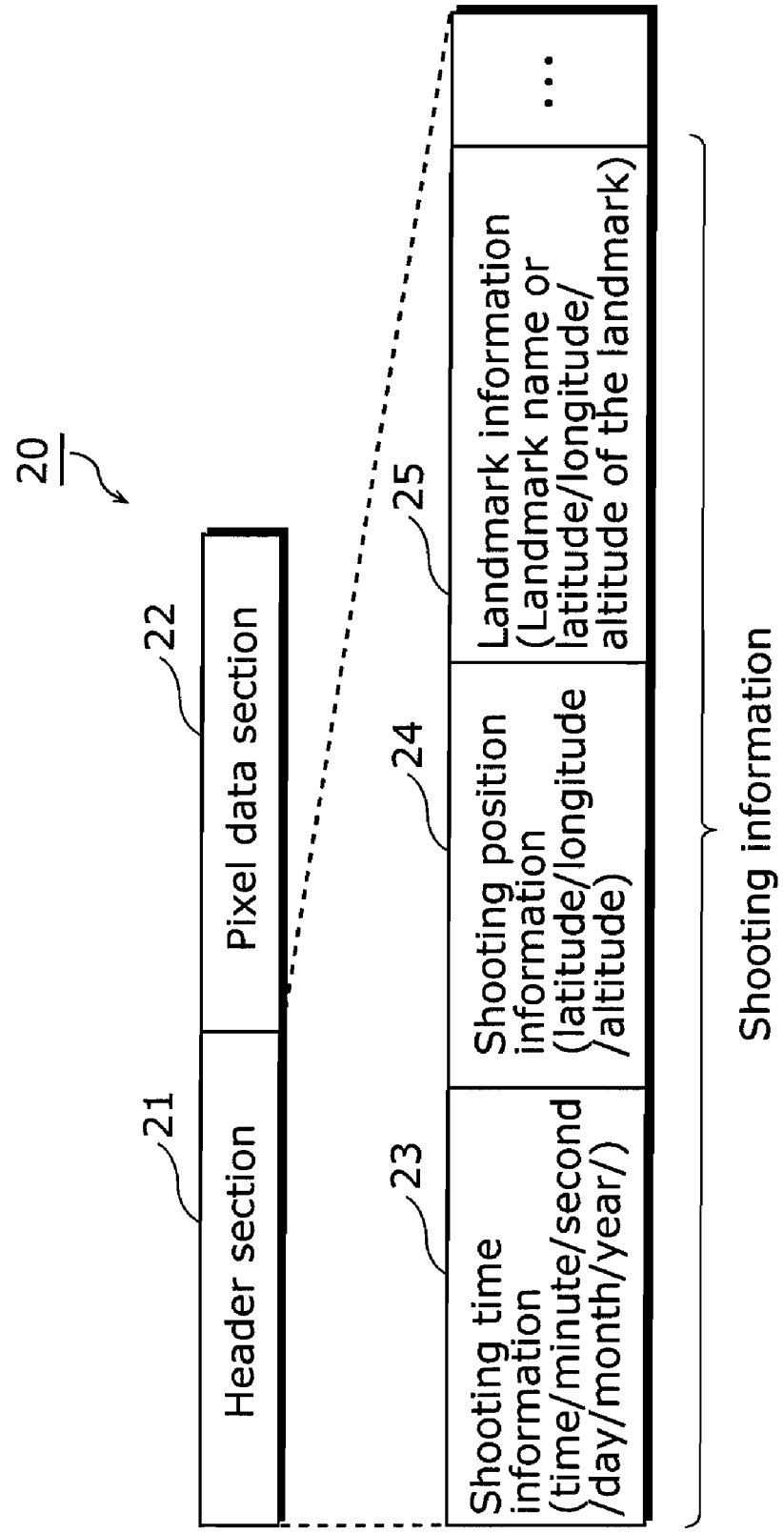
FIG. 2 is a diagram showing a structure example of picture data of a still picture in accordance with the first embodiment.

FIG. 2 is a diagram indicating an example of the structure of the picture data of the still picture obtained or generated in the picture data processing unit 101.

As shown in FIG. 2, picture data 20 includes a header section 21 and a pixel data section 22. Furthermore, the header section 21 stores: shooting time information 23 which indicates a time (time/minute/second/year/month/day); shooting position information 24 which indicates a location where a still picture has been shot (latitude/longitude/altitude); and landmark information 25 which shows a landmark name of the still picture or the information of the landmark position (Note that the shooting time information 23, the shooting position information 24, and the landmark information 25 are collectively called "shooting information"). Meanwhile, the pixel data section 22 stores information of brightness of each pixel which composes a still picture.

The EXIF (Exchangeable Image File) is an example of a standard for recording the shooting information. A still picture is recorded, for example, in a format of the JPEG file or an MPEG file which comply with the EXIF.

Next, the operation of the picture data managing apparatus 100 of the embodiment is described. FIG. 3 is a flowchart showing an operational flow of the picture data management apparatus 100.

First, the input and output unit receives, from a user, information indicating the user's residential address (Step 301). Usually, the operation is performed when the picture data management apparatus 100 is initialized. The residential address inputted by the user is converted to data in the latitude and longitude form and stored in the photographer address information holding unit 104 (Step 302).

Next, the picture data processing unit 101 shoots a still picture by the user pressing the shutter button and generates picture data corresponding to the shot picture (Step 303).

Hence, the latitude and longitude calculating unit 102 calculates location information of the location (namely shooting location) where the picture data management apparatus 100 is positioned at the time point, and converts the calculated position information to data in the latitude and longitude form (Step 304).

Further, the parameter obtaining unit 106 obtains: the position information of the shooting location from the latitude and longitude calculating unit 102; and the photographer's residential position information stored in the photographer address information holding unit 104. Then, the distance HL between the positions is calculated (Step 305).

Then, the landmark distance calculating unit 105 calculates a distance Dn (n: an integer equal to or greater than 1) between the shooting location and each landmark, using the position information of the shooting location obtained from the latitude and longitude calculating unit 102 and the landmark position information obtained in the order of precedence from the map information storing unit 103.

Furthermore, the relevance ratio adding unit 107 calculates a relevance ratio Kn (n: an integer equal to or greater than 1), a weight value, for each landmark, using the parameter inputted by the landmark calculating unit 105 and the parameter obtaining unit 106 (Step 307).

The above processing is repeatedly performed for all the landmarks, following which the distance Dn between each of the landmarks and the shooting location is calculated (Step 306 to Step 308). Note that the number of the landmarks n used for calculation of the distance Dn may be limited to the degree of the distance from the shooting location or determined to be a predetermined number.

Next, the parameter obtaining unit 106: compares a predetermined threshold T and a relevance ratio K of each landmark, the relevance ratio K which is obtained from the relevance ratio adding unit 107; identifies a landmark with a relevance ratio K greater than the threshold T as a landmark to be added to the still picture obtained from the picture data processing unit 101; and writes the identified landmark in a field of the landmark information 25 of the header section 21 in the still picture (Step 309). Note that plural landmarks may be selected.

Here, an algorithm which calculates the relevance ratio is described, using the distance Dn (n: an integer equal to or greater than 1) between the shooting location and each landmark, and the distance HL between a shooting location P and the photographer's residence.

First, the greater a distance Ds between the position of a landmark S and the shooting location P is, the less the relevance ratio K between the landmark S and a shot picture is considered to be; therefore, the expression between the relevance ratio K and the distance Ds is defined as follows:

$$K = \alpha \times 1/Ds \quad (1)$$

Note that $\alpha$ is a coefficient and determined by the name recognition of the shooting location P and the density of landmarks.

Moreover, the greater the distance HL between the photographer's residence and the shooting location is, the higher the relevance ratio to the shot still picture is considered to be even though the landmark is far from the shooting location; therefore, when adding the element of the distance HL to the expression representing the relevance ratio K between the landmark S and the still picture, the definition is as follows:

$$K = \alpha \times 1/Ds + \beta \times HL \quad (2)$$

Note that $\beta$ is a coefficient and determined depending on the relationship between characteristics of a distance HL and a Ds. Hence, the value of the relevance ratio K between the shot still picture and each landmark is calculated (Step 307).

In the case where the relevance ratio of each of the landmarks has been completed, the next operation is performed. In the case where the calculation has not been completed (Step 308: No), relevance ratios K of the remaining landmarks are calculated (Step 306 to Step 308).

An operation by the picture data managing apparatus 100 of the present embodiment is described below in more detail with reference to an example. Here, it is assumed that a photographer A whose residence is in Osaka and a photographer B whose residence is in Tokyo shoot still pictures at the same location, and the difference of landmark weight values, which are added to the still pictures, is compared.

Figure 5:
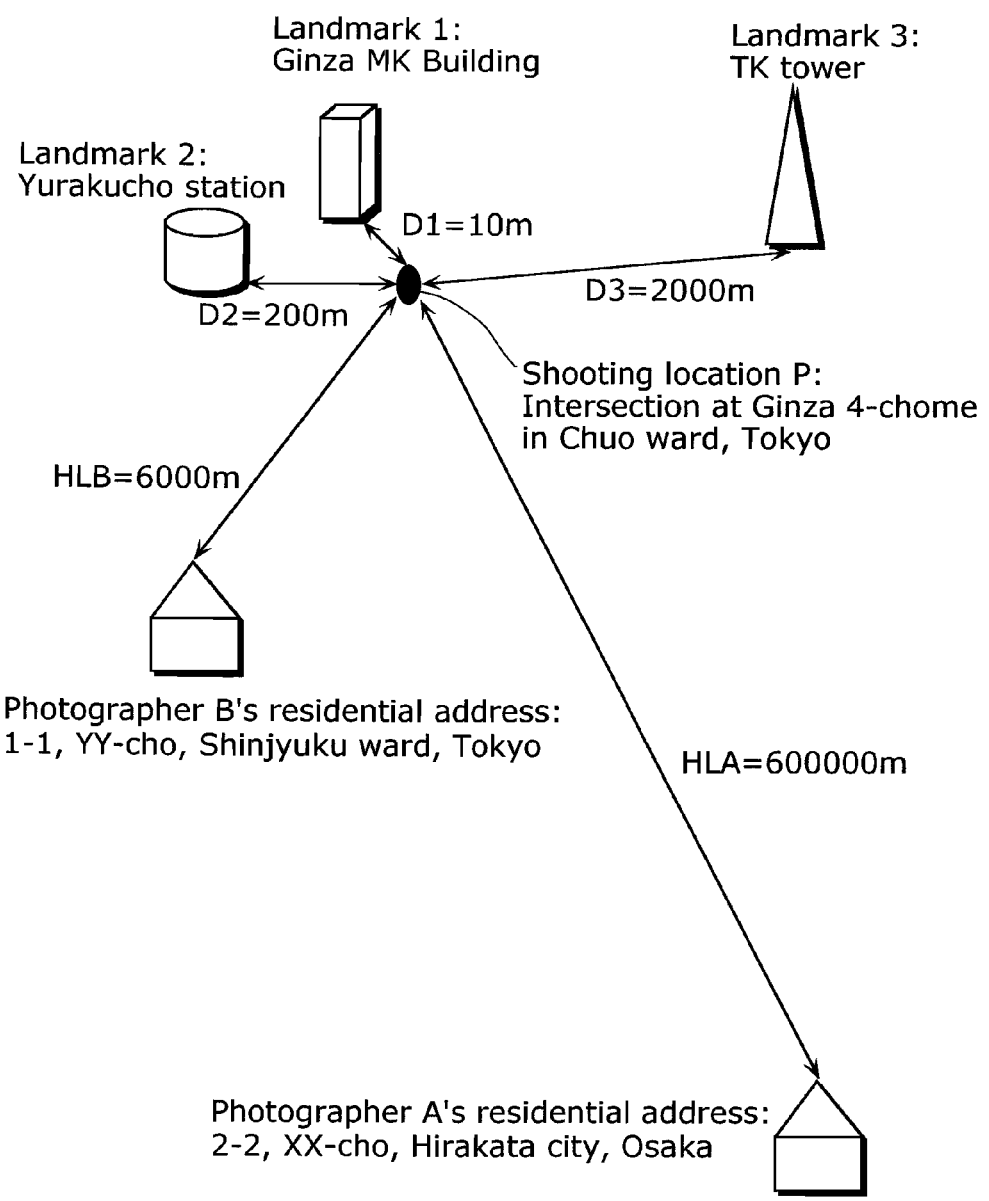
FIG. 5 is a diagram showing positional relationships between: a shooting location; and a photographer's residence, and each of landmarks.

FIG. 4 shows symbols indicating each point used in the following example and position information of each point in a latitude and longitude form. FIG. 5 is a diagram showing positional relationship among a shooting location, a photographer's residence, and each landmark used in a following example.

First, the photographer address information holding unit 104 is received to hold the photographer A's residential address "2-2 XX-cho Hirakata city, Osaka" from the photographer A via the input and output unit. Accordingly, the photographer address information holding unit 104: obtains a corresponding landmark, stored in the map information storing unit 103, to "2-2 XX-cho Hirakata city, Osaka"; obtains the corresponding landmark in "NE Osaka" which is in the latitude and longitude form of the landmark's position information that is linked to the landmark; and holds the landmark in the photographer address information holding unit 104.

Next, the photographer A moves to a certain location, and shoots a still picture by pressing the shutter button on the picture data managing apparatus 100, and consequently, the latitude and longitude calculating unit 102 identifies "NE Ginza" which is in the latitude and longitude form of the position information of "Intersection on Ginza 4th street" in Chuo ward, Tokyo", indicating a shooting location P where the picture data managing apparatus 100 exists at the time point (for example, 17:30:20:, Mar. 31, 2005).

Then, the landmark distance calculating unit 105 calculates a distance Dn (n: an integer equal to or greater than 1) between the shooting position P and each landmark, using "NE Ginza", the position information of the shooting location P, obtained from the latitude and longitude calculating unit 102 and the position information of the respective landmarks which is obtained from the map information storing unit 103. For simplification of the description, landmarks are the following three in the example. Note that information in the parentheses is position information in the form of latitude and longitude.

Landmark 1: Ginza MK Building (NEMK Building) Distance D1=10 m
Landmark 2: Yurakucho station (NE Yurakucho Station) Distance D2=200 m
Landmark 3: TK tower (NETK Tower) Distance D3=2000 m The landmark distance calculating unit 105 obtains the location information "NEMK Building" of Landmark 1 from the map information storing unit 103, and calculates the distance D1=10 m to the position information of the shooting location "NE Ginza." Likewise, for Landmark 2 and Landmark 3, "the distance D2=200 m" and "D3=2000 m" from "NE Ginza" are calculated.

Further, the parameter obtaining unit 106 obtains: the position information of the shooting location P "NE Ginza" from the latitude and longitude calculating unit 102; and the photographer's residential position information, "NE Osaka", held in the photographer address information holding unit 104. Then, HLA=600000 m which is the distance between the both positional information is calculated.

Next, the relevance ratio adding unit 107 calculates relevance ratios K1A, K2A, and K3A on a landmark-by-landmark basis in order to provide a weight value with respect to the shot still picture with individual Landmark 1, Landmark 2, and Landmark 3, using the D1, D2, and D3 obtained from the landmark distance calculating unit 105 and the HLA inputted from the parameter obtaining unit 106 as parameters. As a calculation algorithm of the relevance ratio Kn, the following expression (3) is used.

$$Kn = \alpha \times 1/Dn + \beta \times HL \quad (3)$$

Where, Dn (n=1, 2, 3 . . . ) is a distance between the shooting location and each landmark, and $\alpha$ and $\beta$ are coefficients. Where, $\alpha$=2000, and $\beta$=1/20000 are assigned. Relevance ratios Kna (n=1 to 3 in this case) for the respective landmarks to the still picture that the photographer A shoots are as follows:

$$K1A = 200 + 50 = 250; \quad (4\text{-}1)$$

$$K2A = 20 + 50 = 70; \text{ and} \quad (4\text{-}2)$$

$$K3A = 1 + 50 = 71. \quad (4\text{-}3)$$

Next, a case is considered where the photographer B whose residential address as an object of comparison is "1-1 YY-cho Shinjyuku ward, Tokyo" shoots at "Intersection on Ginza 4th street" in Chu-o ward, Tokyo", as the photographer A does. A relevance ratio between a still picture which the photographer B shoots and each landmark is calculated with the same scheme as the photographer A performed. The parameter obtaining unit 106 calculates a distance HLB between the photographer B's residential address "1-1 YY-cho Shinjyuku ward, Tokyo" and the shooting location P to be 6000 m. Then, as with the photographer A, the relevance ratios KnB between "1-1 YY-cho Shinjyuku ward, Tokyo", the shooting location P, and each landmark are calculated as follows.

$$K1B = 200 + 3 = 203 \quad (5\text{-}1)$$

$$K2B = 20 + 3 = 23 \quad (5\text{-}2)$$

$$K3B = 1 + 3 = 4 \quad (5\text{-}3)$$

The above calculation results are compiled in FIG. 6. FIG. 6A shows calculation results of relevance ratios K on the photographer A, and FIG. 6B shows calculation results of relevance ratios K on the photographer B.

Next, the parameter obtaining unit 106 configures a value "60" obtained by a preliminary experiment and the like as the threshold T which determine whether or not a landmark that is added to a still picture is adopted as metadata, following which when the value of the relevance ratio K is 60 or more, the landmark is adopted for being written in the metadata of the still picture. Then, upon inputting relevance ratios K of the respective landmarks which are calculated by the relevance ratio adding unit 107, in the case where the photographer A shoots, the values of the relevance ratio K1A and the relevance ratio K2A become 60 or more; accordingly, Landmark 1 and Landmark 2 are chosen as metadata for the still picture, then, Landmark 1 and Landmark 2 are written in the header section 21 of the still picture that the photographer A shoots. A written form may be the name of a landmark, such as "Ginza MK Building", or a representation of the location information of the landmark in a form of latitude and longitude.

On the other hand, when the photographer B shoots, K1B is the only relevance ratio whose value becomes more than 60, then only Landmark 1 is selected as the metadata for the still picture, and Landmarks 2 and 3 are not selected as metadata. In other words, in the case of the photographer A with less knowledge of the neighborhood around the shooting location unlike the photographer B with more knowledge of the neighborhood around the shooting location, a landmark located a little far from the shooting location can be selected as metadata. A landmark near the shooting location, irrespective of whether the photographer A or B, is adopted as metadata.

Note that even though the threshold T here is 60, an appropriate change can be made: the relevance ratio K can be dynamically changed with a statistical process; the threshold T can be changed by a direction from the photographer; and the threshold T can be automatically changed by judging based on the use status.

By doing so, appropriate weight values for the photographer are added to plural landmarks; consequently, a landmark name, reflecting the content of a still picture as appropriate as possible, can be added as metadata of a still picture.

Note that the first embodiment of the present invention describes that the picture data processing unit 101 obtains a function to shoot a still picture; however, without the function to shoot a still picture, the picture data processing unit 101 may receive a still picture which is shot with external devices.

(Variation 1)

In the first embodiment, a landmark is considered as a "point" in the case where the distance between a shooting location and a landmark is determined; however, a problem arises when a landmark indicates a representative point on certain premises.

Figure 7:
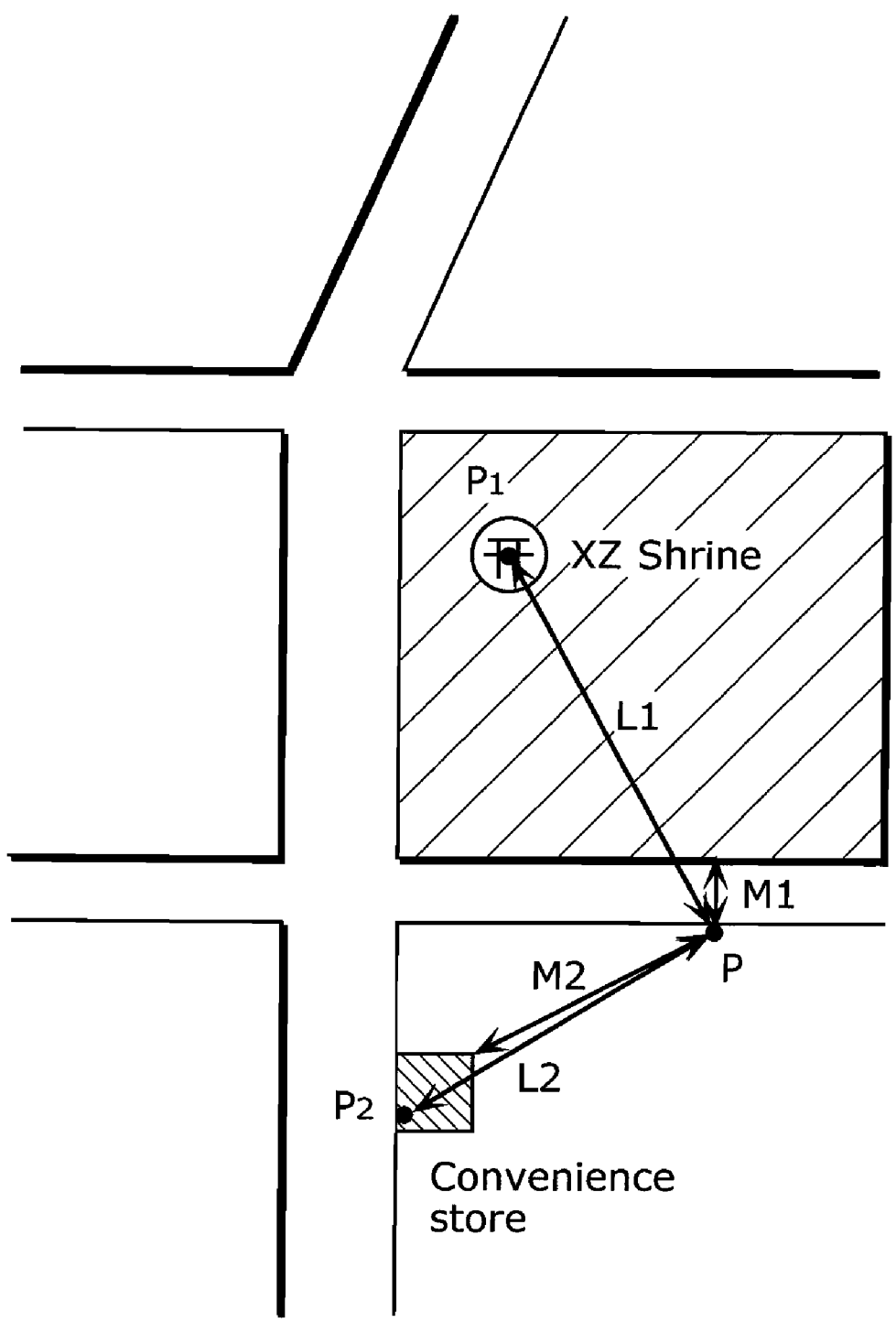
FIG. 7 is a diagram describing a problem in the case where a landmark is indicated in a representative point in certain premises.

FIG. 7 is a diagram describing a problem when a landmark indicates in a representative point on certain premises.

As shown in FIG. 7, when a user shoots at a shooting location P, an "XZ Shrine" and a "Convenience store" are considered to be candidates for the nearest landmark. Here, since the position information of the "XZ Shrine" is registered based on a position P1, which is farther than a position P2 of the "Convenience store" (namely L1>L2), the "Convenience store" is determined as a first landmark, and the "XZ Shrine" is determined as a second landmark. However, from the point of the photographer, a judgment is made that the "XZ Shrine" should be selected as the first landmark since the premises of the "XZ Shrine" is directly before the shooting location P and much nearer than the "Convenience store."

Figure 8:
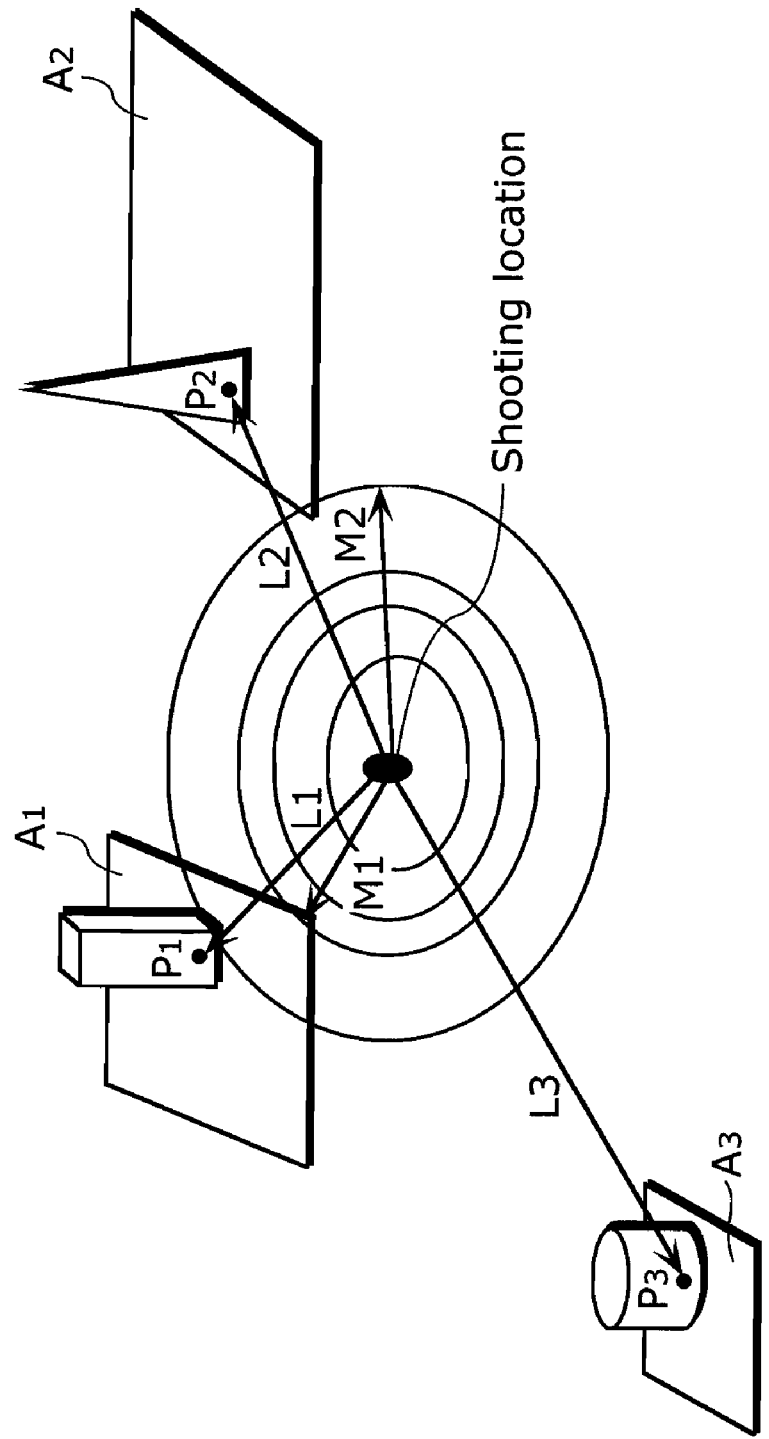
FIG. 8 is a diagram describing a solution to the problem in the case where the landmark is indicated in a representative point in certain premises.

In order to solve the problem, then, the nearest landmark is determined, using a concentric circle around which the shooting location is centered. FIG. 8 is a diagram describing a solution to a problem in the case where a landmark is indicated in a representative point on certain premises. As shown in FIG. 8, when there are premises including plural landmarks, the concentric circle (Note that the circle can be an ellipse having the major axis for the shooting direction) with the shooting location P as the center is drawn, and the landmark in the premises which is within the shortest radius (the breadth or the length in the case of a concentric ellipse) is determined as the nearest landmark. Here, the information of each premises is previously stored in the map information storing unit 103.

Furthermore, as shown in FIG. 8, when there are plural landmarks (In the case of Landmark P1 with Premises A1 and Landmark P2 with Premises A2, for example) within a concentric circle with a previously specified radius (a concentric circle with a radius M2, for example), the landmark to be adopted can be determined based on the distance between the shooting location P and the premises including each landmark and a weight value on each landmark.

(Variation 2)

Figure 9:
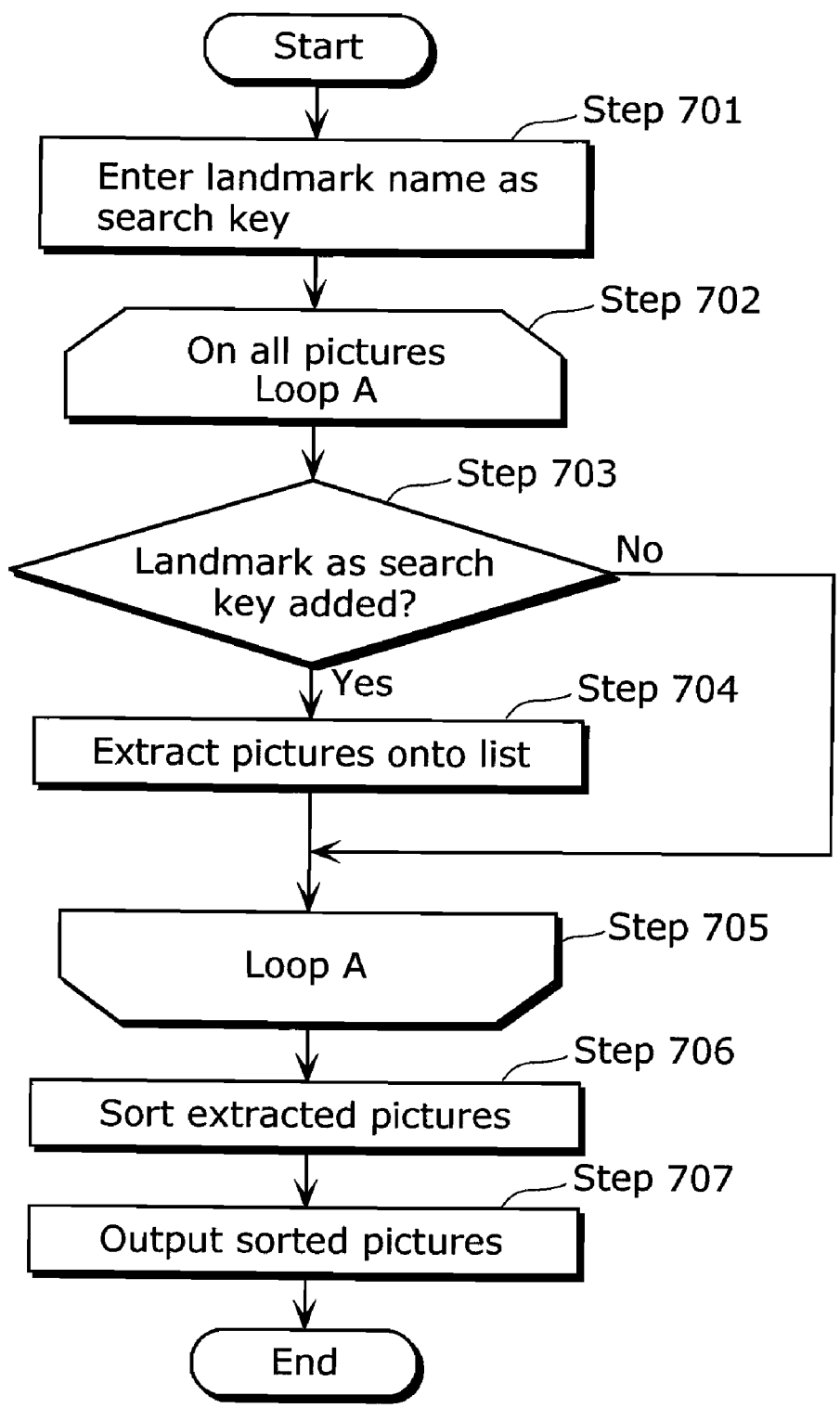
FIG. 9 is a flowchart when a still picture is searched for, using a landmark name and a relevance ratio K.

When a specific picture is searched out of shot still pictures, the photographer can search for a target still picture, using an added landmark name and a relevance ratio K. The picture data processing unit 101 in the picture data management apparatus 100 also includes the searching function. The searching function in the picture data processing unit 101 is described, using FIG. 9. FIG. 9 is a flowchart when a still picture is searched, using a landmark name and a relevance ratio K.

First, upon reception of a landmark name, entered by the photographer via the input and output unit, as a search key (Step 701), the picture data processing unit 101 judges whether or not the landmark name inputted as the search key has been added to each of the target still pictures to be searched for, (Step 703). The still pictures with the added landmark name are enlisted on a picture list (Step 704). When the landmark name is not added, the search target is moved to the next still picture (Step 702 to Step 705).

Next, the picture data processing unit 101 sorts the enlisted pictures having relevance ratios K so as to be sorted in descending order (Step 706), using a corresponding relevance ratio K to the landmark name which has been inputted as the search key, and outputs the still pictures in the order of the sorting (Step 707).

As mentioned above, since a landmark name which is closely related to a shot still picture for a photographer is stored in the header section 21 of the still picture as the metadata of the still picture, in the case where the still picture is searched for, the target still picture is searched for not only from the still pictures sorted in the chronological order of shooting times, but also from the still pictures whose landmark names are used as search keys; consequently, the photographer can search out the target still picture, visualizing the shooting location. Further, along with obtaining a search result in the descending order of the relevance ratios K, a picture with more than a predetermined relevance ratio can also be extracted. Moreover, in the case where a large number of still pictures are organized and classified, a folder can be created to organize the folder by the landmark name that is added as the metadata. Hence, even though a user may have a vague memory of when a still picture was shot, a search, based on a shooting location which is important information in the case where the still picture is described, is appropriately performed using a landmark which leaves a more remarkable impression than a latitude and longitude and an address leave.

Note that what is written in the header section 21 of a still picture is not limited to a landmark name, and a calculated relevance ratio k may be described. By doing so, a still-picture search where the relevance ratio K is used as a search key can provide a more appropriate still picture as a result of the search than in a still-picture search where only a landmark name is used as a search key.

Note that the relevance ratio K can add a weight value not only on each landmark, but also on the kind of the landmark. Specifically, the greater the distance HL between the photographer's residence and a shooting location is, the higher the relevancy to a highly public landmark such as a place-name and a public institution is. Moreover, the greater the distance HL is, a place-name covering a larger area can be selected out of place-names.

Note that in the example, the distance HL between the photographer's residence and the shooting location is used as a parameter for calculating the relevance ratio. However, the parameter is not limited to the distance between the photographer and the shooting location, and, for example, the distance between the residence of an audience of the still picture and the shooting location may be used.

Note that a function to judge whether the photographer is one of photographers A and B can be included, so that the parameter to be used for calculation of the relevance ratio can be switched based on the judged photographer. As a method to judge the photographer, there is a method to have the photographer input his identification before a shooting. Meanwhile, a method for general personal automatic authentication, such as vein authentication and face authentication, can also be used.

Note that in the above embodiment, the picture data managing apparatus 100 is a digital camera shooting a still picture; however, the picture data managing apparatus 100 can also be a digital movie camera shooting a motion picture. In such a case, more than one shooting locations appear, so that a movement locus can be handled as the shooting location. One of a shooting starting location, shooting finishing location, and most frequent staying location are also handled as the shooting locations. Moreover, since the shooting time is a period of time, one of a shooting starting time, shooting finishing time, and shooting intermediate time is handled as the shooting time.

The relevance ratio K is calculated and added when shooting. Meanwhile, at the time of searching, by calculating the relevance ratio K, using the user's movement history and the number of shootings, the search with knowledge of the neighborhood is possible.

Meanwhile, as a matter of course, the present invention does not limit the sequence of: the shooting time information 23 for a still picture, the shooting position information 24, and the landmark information 25; and the header section 21, and the pixel data section 22. Moreover, there may be a plural pieces of landmark information 25. Further, in the embodiment, one of the shooting position information 24 of the shooting position and the landmark information 25 may be included in a still picture; accordingly, the shooting time information 23 does not have to be included.

Note that a picture to be searched for can be a picture to be stored in: a picture storing unit (not shown) in the picture data managing apparatus 100; a picture storing unit included in another device such as a photo storage; and a picture storing unit in a server or the like on the Internet.

Furthermore, in the first embodiment, the embodiment where pictures to be shot are still pictures is described; as a matter of course, a motion picture may be shot.

In the first embodiment, the embodiment is described as having a structure only with a digital camera. However, the structure is not limited to the structure only with the digital camera; as a matter of course, the structure may be a structure with a combination of a digital camera and a display apparatus such as a television. Further, the structure may be a structure with a combination of a digital camera and a picture searching apparatus such as a personal computer.

Second Embodiment

In the first embodiment, an embodiment to calculate a weight value (relevance ratio) has been described, using the distance HL between the shooting location and the photographer's residence and the distance D between the shooting location and a landmark position as a parameter which the relevance ratio adding unit 107 obtains. In this embodiment, an embodiment to calculate a weight value using another parameter is described.

Figure 10:
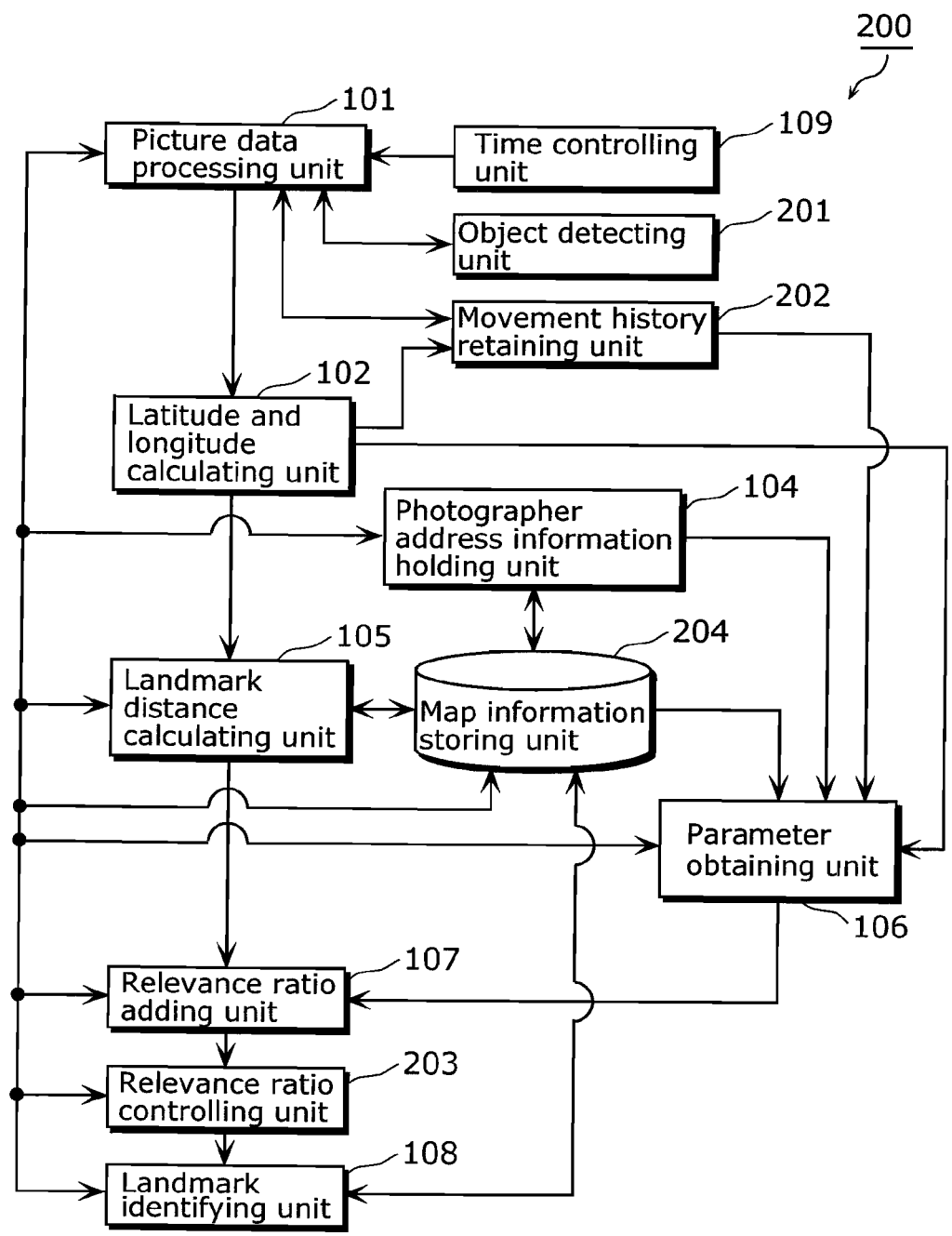
FIG. 10 is a block diagram showing a functional structure of a picture data managing apparatus in accordance with a second embodiment.

FIG. 10 is a block diagram showing a functional structure of a picture data managing apparatus 200 of the present embodiment. Note that the same functional elements as those in the picture data managing apparatus 100 of the first embodiment are assigned with the same numerical references; accordingly, the description is omitted.

The picture data managing apparatus 200 further includes an object detecting unit 201, a movement history holding unit 202, and a relevance ratio controlling unit 203, in addition to the functional elements of the picture data managing apparatus 100 of the first embodiment.

The object detecting unit 201 includes a subject distance measuring unit (not shown) which measures a subject distance between the subject and a camera. Then, the relevance ratio adding unit 107 obtains the subject distance as a parameter via the picture data processing unit 101. The greater the subject distance is, the more likely the picture shows distant landscape, such as scenery, and then, the weight values of on a landmark around the shooting location and a landmark far from the shooting location are increased. By doing so, it is possible to judge whether or not the picture is a scenic picture, and optimize the landmark, which is added as metadata of a still picture to be a scenic picture.

Here, the subject distance, or the distance between a subject and a camera, can be obtained by measuring the distance with an ultrasonic or laser beam or with a distance meter (range finder) linked with the lens moved when the camera focuses; however, another method is also possible as far as the distance between the subject and the camera can be measured, and as a matter of course, the method for measuring the subject distance is not limited to the aforementioned methods.

Further, the object detecting unit 201 includes a person detecting unit (not shown) which judges whether or not a person is in a still picture. Then, the relevance ratio adding unit 107 obtains a status of presence or absence of a person as a parameter via the picture data processing unit 101. When a person is in the still picture, a weight value of a landmark which is far from the shooting location is decreased. For example, in the case of a picture in which a person is present, a weight value for a landmark located within a radius of 1000 m or more, is decreased by 50%. By doing so, it is possible to judge whether or not the picture is a portrait, and optimize the landmark, which is added as metadata of a still picture to be a portrait.

Further, the object detecting unit 201 includes an indoors judging unit (not shown) which judges whether or not a shooting location is indoors. Then, the relevance ratio adding unit 107 obtains a status that the shooting location is indoors as a parameter via the picture data processing unit 101. When the shooting location is indoors, a weight value of a landmark which is far from the shooting location is decreased.

Here, as methods which the indoors judging unit uses to judge whether or not a shooting location is indoors, the following methods can be used: obtaining a profile of a building from map information and judging whether the shooting location is within or outside of the profile; and judging whether the shooting location is within or outside of the profile based on whether or not the indoors judging unit can receive a highly directional electric wave which can be received only indoors.

The movement history holding unit 202 includes a storing unit (not shown) which holds previously shot still pictures shot by a photographer. And the parameter obtaining unit 106 counts, out of the previously shot still pictures, the number of previously shot still pictures ("the number with previously shot history", hereinafter) each of which is assigned with a landmark of the current shooting location or a nearby landmark. The relevance ratio adding unit 107 obtains "the number with the previously shot history" as a parameter, and when the number is a predetermined number or more, the weight value of a landmark which is closest to the shooting location is increased. By doing so, a location with previous shooting history is judged as a location with knowledge of the neighborhood, and the landmark, that is added as a metadata of a still picture which has been shot at the location, can be optimized.

Further, the movement history holding unit 202, using the latitude and longitude calculating unit 102, continues to accumulate pieces of location information which change in accordance with movements of the photographer, and holds the photographer's action history. Then, the parameter obtaining unit 106 obtains a shooting time from the picture data processing unit 101, obtains the movement history around the shooting time from the movement history holding unit 202, and calculates a sojourn time for which the photographer stays. Hence, the relevance ratio adding unit 107 obtains the sojourn time as a parameter via the picture data processing unit 101. When the sojourn time is greater than a predetermined time, the weight value of a shooting location as a landmark is increased. For example, when the photographer stays in the same shooting location 30 minutes or more, the weight value of the landmark of the shooting location is increased by 50%. By doing so, it is possible to adopt only a location or a building where the photographer spent time more than the predetermined sojourn time as a landmark to be added as metadata of a still picture.

Further, it is considered that the movement history holding unit 202 has a structure including a storing unit (not shown) which records information that the photographer has previously received. The parameter obtaining unit 106 calculates, out of the previously received information, information reception history which indicates frequency of receiving information of the shooting location. The relevance ratio adding unit 107 obtains the information reception history regarding the shooting location, and changes the weight value of the landmark using the information reception history. Specific examples of the information that the photographer has previously received include:

information search history, browsing history, and a used search keyword on a website of a PC (personal computer) and a handheld device;

watching and recording history of TV information program; and book purchase history and checkout history from the library. The more frequently a shooting location is included in the information reception history, the more the weight value of the landmark closer to the shooting location is increased. By doing so, the location previously having information reception history with high frequency is judged as a location with knowledge of the neighborhood, and the landmark, that is added as a metadata of a still picture which has been shot at the location, can be optimized.

Moreover, the movement history holding unit 202 includes a companion identifying unit which identifies a companion with the photographer when shooting and a companion information storing unit which records information the companion has previously received. The parameter obtaining unit 106 calculates the companion's information reception history, using the companion's information obtained from the companion information storing unit. The relevance ratio adding unit 107 obtains the companion's information reception history regarding the shooting location, and changes, using the information reception history, the weight value of the landmark near the shooting location.

Note that the companion's information is the same as the information enumerated as the photographer's information in the present invention. Specific examples of the companion's information include:

the companion's residence;

previous shooting history at the shooting location;

information search history, browsing history, and a used search keyword on a website of a PC and a handheld device;

watching and recording history of TV information program; and book purchase history and check-out-from-the-library history is considered.

The more frequently a shooting location is included in the information reception history, the more the weight value of the landmark closer to the shooting location is increased. By doing so, the location previously having information reception history with high frequency is judged as a location with knowledge of the neighborhood, and the landmark, that is added as a metadata of a still picture which has been shot at the location, can be optimized.

In addition to the functions of the map information storing unit 103 in the first embodiment, a map information storing unit 204 links to the landmark and an attribute according to the landmark itself. The relevance ratio adding unit 107 obtains the attribute of the landmark as a parameter, and changes; using the attribute of the landmark, the weight value of the landmark.

Note that conceivable attributes of a landmark are: the kind of landmark; the height/capacity of the landmark; how many times the landmark has been described in travel guides, whether the landmark has been described at the tops or bottoms of the pages in the travel guides, and the font sizes used in the descriptions. The kinds of landmark include public property, private property, building, natural object, a name which indicates an individual tenant, and a name which indicates a wide area including the individual tenant. The higher an attribute of a landmark is and the greater the capacity is, the higher the relevance ratio is increased by the height and capacity of the landmark. Further, the greater the landmark is featured in the travel guides, the higher the relevance ratio is increased. By doing so, the relevance ratio of a landmark can be specifically defined, and the landmark, that is added as a metadata of a still picture which has been shot at the location, can be optimized. Moreover, the greater the distance between the shooting location and the photographer's residence, the higher the relevance ratio on a public property is increased than the relevance ratio on a private property. This makes it possible to add the more optimized metadata. Further, the greater the distance between the shooting location and the photographer's residenceis, the higher the relevance ratio that corresponds to the travel guides becomes, following which implication as a travel is added to the metadata. Consequently, the optimum metadata can be added.

Moreover, since the picture data processing unit 101 obtains a function for obtaining a shooting time of a still picture, or the time when the still picture was shot, the relevance ratio adding unit 107 obtains the shooting time from the picture data processing unit 101, and changes the weight value of the landmark based on the shooting time. Specifically, in the case where the shooting time is at night after the sunset, a mountain in a distant landscape becomes invisible, and the landmark becomes less useful. For this reason, the relevance ratio, which is calculated based on the distance between the shooting position and the position of the landmark, is corrected so that the relevance ratio becomes higher than another relevance ratio which is calculated based on another parameter. Furthermore, out of the kinds of the landmark, the relevance ratio on a natural object is corrected so that the relevance ratio becomes low. By doing so, the relationship between the shooting time and another parameter can be reflected upon the relevance ratio; therefore, the landmark, that is added as a metadata of a still picture which has been shot at the location, can be optimized.

The present invention is useful for an apparatus, such as a digital camera, a cellular phone, and a personal computer which perform: classification and organization of picture data, such as still pictures shot with a digital camera and the like; and search of the picture data.

The invention claimed is:

1. A picture data managing apparatus which manages picture data using a landmark, said picture data managing apparatus comprising:
    a landmark candidate selecting unit operable to select candidates for landmarks added to the picture data;
    a parameter obtaining unit operable to obtain, for each of the selected landmark candidates, a parameter indicating a degree of relevance between the selected landmark candidate and the picture data;
    a weight value adding unit operable to add, based on the obtained parameter, a predetermined weight value to the selected candidate of the landmark; and
    a landmark identifying unit operable to identify the landmark to be added to the picture data, based on a degree of the added weight value;
    wherein the parameter is a landmark distance which indicates a distance between a shooting location of a picture corresponding to the picture data and one of the selected candidates of the landmarks;
    wherein said weight value adding unit is operable to add a greater weight value to one or more of the selected candidates of the landmarks having a shorter landmark distance;
    wherein said parameter obtaining unit is further operable to obtain a distance to a subject as a parameter; and
    wherein said weight value adding unit is operable to increase a weight value of each of one or more of the selected candidates of the landmarks having a longer landmark distance as the landmarks have a longer distance to the subject.

2. The picture data managing apparatus according to claim 1, further comprising
    a person detecting unit operable to detect a presence or absence of a person as the subject;
    wherein said parameter obtaining unit is further operable to obtain the presence or absence of the person as a parameter; and
    wherein said weight value adding unit is operable to decrease the weight value of one or more of the selected candidates of the landmarks having a longer landmark distance in the case where the person is present in the picture as the subject.

3. The picture data managing apparatus according to claim 1, further comprising
    an indoors judging unit operable to judge whether or not a shooting location is indoors;
    wherein said parameter obtaining unit is operable to obtain a parameter indicating whether the shooting location is indoors or not; and
    said weight value adding unit is operable to decrease the weight value of one or more of the selected candidates of the landmarks having a longer landmark distance in the case where the shooting location is indoors.

4. A picture data managing apparatus which manages picture data using a landmark, said picture data managing apparatus comprising:
    a landmark candidate selecting unit operable to select candidates for landmarks added to the picture data,
    a parameter obtaining unit operable to obtain, for each of the selected landmark candidates, a parameter indicating a degree of relevance between the selected landmark candidate and the picture data;
    a weight value adding unit operable to add, based on the obtained parameter, a predetermined weight value to the selected candidate of the landmark; and
    a landmark identifying unit operable to identify the landmark to be added to the picture data, based on a degree of the added weight value;
    wherein the landmark is included in an area;
    wherein the parameter is a landmark distance indicating a distance between the shooting location of the picture corresponding to the picture data and a nearest boundary of each of the areas regarding the selected candidates of the landmarks; and
    wherein said weight value adding unit is operable to add a greater weight value to the landmark having a shorter landmark distance.

5. A picture data managing apparatus which manages picture data using a landmark, said picture data managing apparatus comprising:
    a landmark candidate selecting unit operable to select candidates for landmarks added to the picture data;
    a parameter obtaining unit operable to obtain, for each of the selected landmark candidates, a parameter indicating a degree of relevance between the selected landmark candidate and the picture data;
    a weight value adding unit operable to add, based on the obtained parameter, a predetermined weight value to the selected candidate of the landmark; and
    a landmark identifying unit operable to identify the landmark to be added to the picture data, based on a degree of the added weight value;
    wherein the parameter is a landmark distance which indicates a distance between a shooting location of a picture corresponding to the picture data and one of the selected candidates of the landmarks;
    wherein said weight value adding unit is operable to add a greater weight value to one or more of the selected candidates of the landmarks having a shorter landmark distance;
    wherein the parameter is the landmark distance regarding the shooting location of the picture corresponding to the picture data and the candidate of the selected landmark, and a residence distance indicating a distance between the residence of the photographer of the picture corresponding to the picture data and the shooting location; and
    wherein said weight value adding unit is operable to add a greater weight value to one or more of the selected candidates of the landmarks having the shorter landmark distance and having a longer residence distance.

6. A picture data managing apparatus which manages picture data using a landmark, said picture data managing apparatus comprising:
    a landmark candidate selecting unit operable to select candidates for landmarks added to the picture data;
    a parameter obtaining unit operable to obtain, for each of the selected landmark candidates, a parameter indicating a degree of relevance between the selected landmark candidate and the picture data;

a weight value adding unit operable to add, based on the obtained parameter, a predetermined weight value to the selected candidate of the landmark;
a landmark identifying unit operable to identify the landmark to be added to the picture data, based on a degree of the added weight value; and
a picture storing unit operable to retain picture data of the picture shot by a photographer;
wherein said parameter obtaining unit is further operable to obtain, as a parameter, the number of previously shot pictures among the shot pictures in shooting history for counting the number of pictures added with a landmark which is the shooting location of the picture or is in the vicinity of the picture; and
wherein said weight value adding unit is operable to increase a weight value of each of one or more of the selected candidates of the landmarks having a shorter landmark distance in the case where the number of previously shot pictures in the shooting history is equal to or more than a predetermined number.

7. A picture data managing apparatus which manages picture data using a landmark, said picture data managing apparatus comprising:
a landmark candidate selecting unit operable to select candidates for landmarks added to the picture data;
a parameter obtaining unit operable to obtain, for each of the selected landmark candidates, a parameter indicating a degree of relevance between the selected landmark candidate and the picture data;
a weight value adding unit operable to add, based on the obtained parameter, a predetermined weight value to the selected candidate of the landmark;
a landmark identifying unit operable to identify the landmark to be added to the picture data, based on a degree of the added weight value;
a shooting time obtaining unit operable to obtain a shooting time of the picture;
an action history retaining unit operable to obtain and accumulate position changes, shown in position information, accompanied by movements of a photographer in chronological order; and
a sojourn time calculating unit operable to calculate a sojourn time at a predetermined location, referring to said movement history holding unit;
wherein said parameter obtaining unit is operable to obtain the sojourn time as a parameter; and
wherein said weight value adding unit is operable to increase a weight value of a landmark which is a shooting location in the case where the sojourn time is equal to or more than a predetermined time.

8. A picture data managing apparatus which manages picture data using a landmark, said picture data managing apparatus comprising:
a landmark candidate selecting unit operable to select candidates for landmarks added to the picture data;
a parameter obtaining unit operable to obtain, for each of the selected landmark candidates, a parameter indicating a degree of relevance between the selected landmark candidate and the picture data;
a weight value adding unit operable to add, based on the obtained parameter, a predetermined weight value to the selected candidate of the landmark;
a landmark identifying unit operable to identify the landmark to be added to the picture data, based on a degree of the added weight value; and
an information reception collecting unit operable to collect information which a photographer has previously received;
wherein said parameter obtaining unit is operable to obtain, as the parameter, information reception frequency history indicating frequency of receiving information relevant to a shooting location, out of the information which has been previously received by the photographer; and
wherein said weight value adding unit is operable to adjust the degree of the weight value of the landmark based on the information reception history.

9. A picture data managing apparatus which manages picture data using a landmark, said picture data managing apparatus comprising:
a landmark candidate selecting unit operable to select candidates for landmarks added to the picture data;
a parameter obtaining unit operable to obtain, for each of the selected landmark candidates, a parameter indicating a degree of relevance between the selected landmark candidate and the picture data;
a weight value adding unit operable to add, based on the obtained parameter, a predetermined weight value to the selected candidate of the landmark;
a landmark identifying unit operable to identify the landmark to be added to the picture data, based on a degree of the added weight value;
a companion identifying unit which identifies a companion who the photographer accompanies during shooting; and
a companion information collecting unit which collects information which the companion has previously received;
wherein said parameter obtaining unit is operable to obtain, as the parameter, companion information frequency history indicating frequency of receiving information relevant to the shooting location, out of the information which has been previously received by the companion; and
wherein said weight value adding unit is operable to adjust the degree of the weight value of the landmark based on the companion information history frequency.

10. A picture data managing apparatus which manages picture data using a landmark, said picture data managing apparatus comprising:
a landmark candidate selecting unit operable to select candidates for landmarks added to the picture data;
a parameter obtaining unit operable to obtain, for each of the selected landmark candidates, a parameter indicating a degree of relevance between the selected landmark candidate and the picture data;
a weight value adding unit operable to add, based on the obtained parameter, a predetermined weight value to the selected candidate of the landmark;
a landmark identifying unit operable to identify the landmark to be added to the picture data, based on a degree of the added weight value;
wherein the landmark further includes information which indicates an attribute of the landmark;
wherein said parameter obtaining unit is operable to obtain the information indicating the attribute of the landmark as the parameter; and
wherein said weight value adding unit is operable to adjust the degree of the weight value of the landmark based on the information indicating the attribute of the landmark.

11. A picture data managing apparatus which manages picture data using a landmark, said picture data managing apparatus comprising:
a landmark candidate selecting unit operable to select candidates for landmarks added to the picture data;
a parameter obtaining unit operable to obtain, for each of the selected landmark candidates, a parameter indicating a degree of relevance between the selected landmark candidate and the picture data;
a weight value adding unit operable to add, based on the obtained parameter, a predetermined weight value to the selected candidate of the landmark;

a landmark identifying unit operable to identify the landmark to be added to the picture data, based on a degree of the added weight value; and a shooting time obtaining unit operable to obtain a shooting time at which a photographer shot a picture;

wherein said parameter obtaining unit is operable to obtain the time of shooting as the parameter; and wherein said weight value adding unit is operable to adjust a degree of the weight value of the landmark based on the shooting time.

12. A picture data managing apparatus which manages picture data using a landmark, said picture data managing apparatus comprising:

a landmark candidate selecting unit operable to select candidates for landmarks added to the picture data;

a parameter obtaining unit operable to obtain, for each of the selected landmark candidates, a parameter indicating a degree of relevance between the selected landmark candidate and the picture data;

a weight value adding unit operable to add, based on the obtained parameter, a predetermined weight value to the selected candidate of the landmark;

a landmark identifying unit operable to identify the landmark to be added to the picture data, based on a degree of the added weight value;

a picture data holding unit operable to add the identified landmark to the picture data and hold the picture data; and a picture data searching unit operable to search said picture data holding unit for the picture data, using a landmark and a weight value of the landmark as search keys.

13. A picture data managing method for managing picture data, using a landmark, said picture data managing method comprising using a computer/processor to perform the following steps:

a landmark candidate selecting step of selecting candidates of landmarks added to the picture data;

a parameter obtaining step of obtaining, for each of the selected landmark candidates, a parameter indicating a degree of relevance between the selected landmark candidate and the picture data;

a weight value adding step of adding, based on the obtained parameter, a predetermined weight value to the selected candidate of the landmark; and a landmark identifying step of identifying the landmark to be added to the picture data, based on a degree of the added weight value;

wherein the parameter is a landmark distance which indicates a distance between a shooting location of a picture corresponding to the picture data and one of the selected candidates of the landmarks;

wherein, in said weight value adding step, a greater weight value is added to one or more of the selected candidates of the landmarks having a shorter landmark distance;

wherein said parameter obtaining step further includes obtaining a distance to a subject as a parameter; and wherein said weight value adding step includes increasing a weight value of each of one or more of the selected candidates of the landmarks having a longer landmark distance as the landmarks have a longer distance to the subject.

14. A non-transitory computer readable medium storing a program for use with a picture data managing apparatus which manages picture data using a landmark, said program causing a computer to execute:

a landmark candidate selecting step of selecting candidates of landmarks added to the picture data;

a parameter obtaining step of obtaining parameters each indicating a degree of relevancy between one of the selected candidates of the landmarks and the picture data;

a weight value adding step of adding, based on the obtained parameter, a predetermined weight value to the selected candidate of the landmark; and a landmark identifying step of identifying the landmark to be added to the picture data, based on degree of the added weight value;

wherein the parameter is a landmark distance which indicates a distance between a shooting location of a picture corresponding to the picture data and one of the selected candidates of the landmarks;

wherein, in said weight value adding step, a greater weight value is added to one or more of the selected candidates of the landmarks having a shorter landmark distance;

wherein said parameter obtaining step further includes obtaining a distance to a subject as a parameter; and wherein said weight value adding step includes increasing a weight value of each of one or more of the selected candidates of the landmarks having a longer landmark distance as the landmarks have a longer distance to the subject.

15. An integrated circuit which manages picture data using a landmark, said integrated circuit comprising:

a landmark candidate selecting unit operable to select candidates of landmarks added to the picture data;

a parameter obtaining unit operable to obtain, for each of the selected landmark candidates, a parameter indicating a degree of relevance between the selected landmark candidate and the picture data;

a weight value adding unit operable to add, based on the obtained parameter, a predetermined weight value to the selected candidate of the landmark; and a landmark identifying unit operable to identify the landmark, based on a degree of the added weight value, wherein the parameter is a landmark distance which indicates a distance between a shooting location of a picture corresponding to the picture data and one of the selected candidates of the landmarks;

wherein said weight value adding unit is operable to add a greater weight value to one or more of the selected candidates of the landmarks having a shorter landmark distance;

wherein said parameter obtaining unit is further operable to obtain a distance to a subject as a parameter; and wherein said weight value adding unit is operable to increase a weight value of each of one or more of the selected candidates of the landmarks having a longer landmark distance as the landmarks have a longer distance to the subject.

16. The picture data managing apparatus according to claim 4, wherein the parameter is the landmark distance regarding the shooting location of the picture corresponding to the picture data and the candidate of the selected landmark, and a residence distance indicating a distance between the residence of the photographer of the picture corresponding to the picture data and the shooting location; and said weight value adding unit is operable to add a greater weight value to one or more of the selected candidates of the landmarks having the shorter landmark distance and having a longer residence distance.

* * * * *